Figure 1:
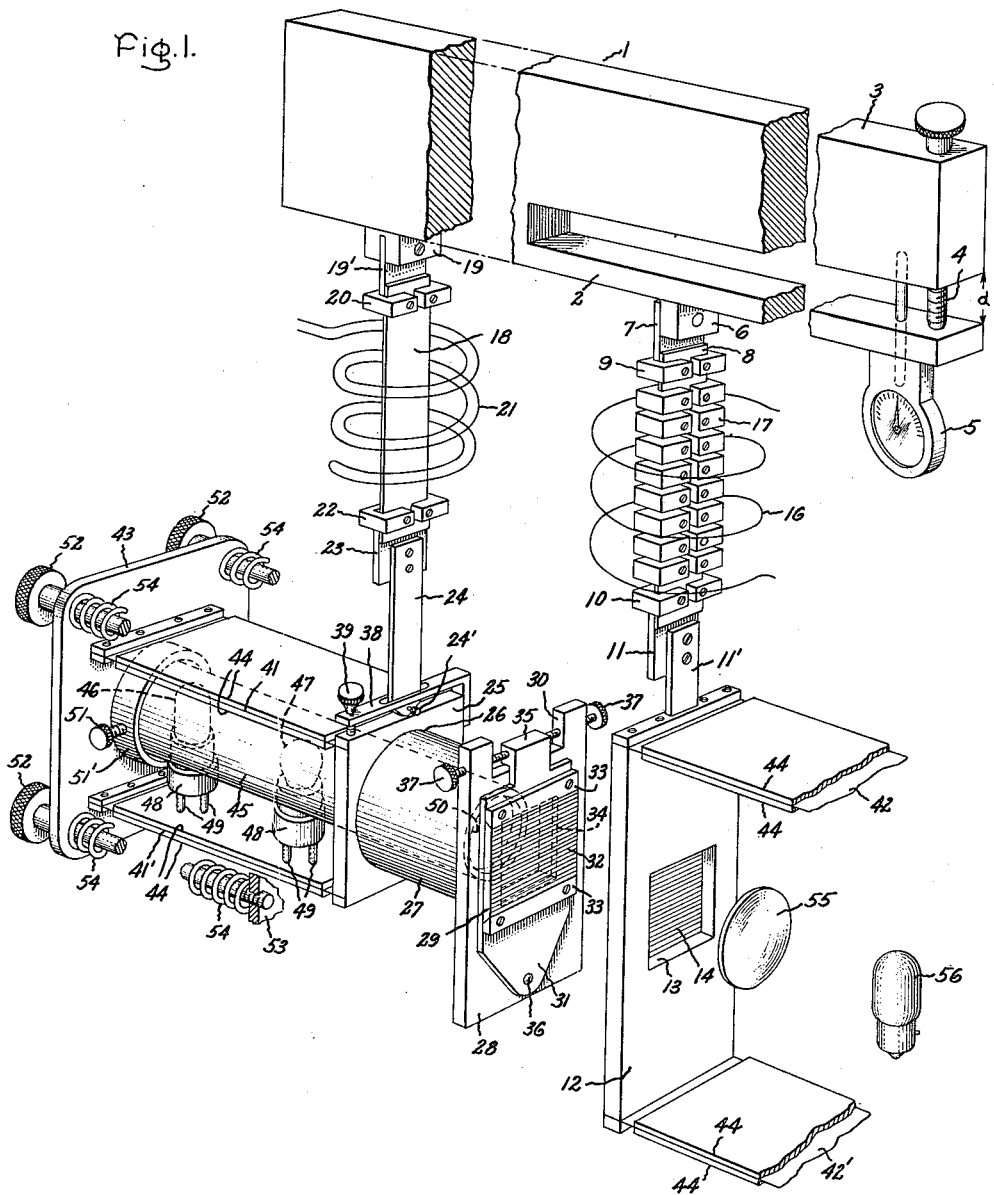

May 13, 1952 W. D. WILLIAMS 2,596,752
MAGNETOSTRICTION MEASURING INSTRUMENT
Filed Jan. 29, 1949 2 SHEETS—SHEET 1

Inventor:
William D. Williams,
by Richard E. Hosley
His Attorney.

May 13, 1952 W. D. WILLIAMS 2,596,752
MAGNETOSTRICTION MEASURING INSTRUMENT
Filed Jan. 29, 1949 2 SHEETS—SHEET 2
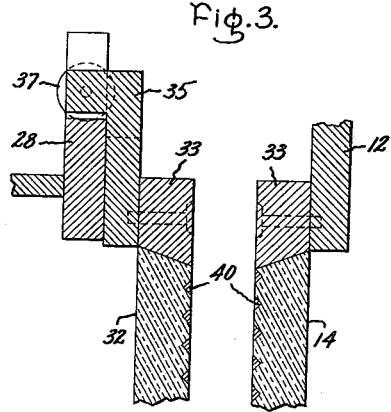
Inventor:
William D. Williams,
by Richard E. Hosley
His Attorney.

Patented May 13, 1952

2,596,752

UNITED STATES PATENT OFFICE 2,596,752

MAGNETOSTRICTION MEASURING INSTRUMENT

William D. Williams, Scotia, N. Y., assignor to General Electric Company, a corporation of New York Application January 29, 1949, Serial No. 73,604

3 Claims. (Cl. 73—432)

My invention relates to devices for measuring extremely small linear displacements and more particularly to a device such as may be used to measure the magnetostriction of materials.

The close tolerances and precision construction of modern electrical and mechanical equipment often make it necessary that extremely small linear displacements of a material caused, by small strains in the order of $40 \times 10^{-6}$ in./in. be measured. Such extremely small changes in dimensions are caused, for example, by temperature changes or when certain materials are placed in a magnetic field. This latter phenomenon is called magnetostriction, and the variation of the length of a specimen caused by magnetostriction is commonly referred to as the Joule effect.

Measuring devices which have heretofore been constructed to indicate minute changes in dimensions have depended primarily upon the mechanical magnification resulting from a system of mechanical levers. While suitable for the measurement of unidirectional or static linear displacements, such as might be caused by the application of a constant magnetic field, the inertia, elasticity and mechanical resonance of the lever arms make these measuring devices inaccurate when used to indicate vibratory displacements such as are caused by the application of an alternating magnetic field. It is an object of my invention, therefore, to provide a device suitable for the measurement of either static or alternating linear displacements of extremely small magnitude.

Another object of my invention is to provide a device of the above type which employs a system of optical magnification alone thereby eliminating the necessity of a cumbersome and complex mechanical lever system.

A further object is to provide a new and improved device suitable for the measurement of the Joule effect of magnetostriction in a material when subjected to either a static or an alternating magnetic field.

An additional object of my invention is to provide a device of the above type in which the output readings indicated can be easily calibrated to read directly the change in the dimensions of a measured specimen.

A still further object of my invention is to provide a device in which the magnetostriction of a specimen can be easily related to the degree of magnetic induction therein.

One embodiment of my invention, as applied to the measurement of the Joule effect of magnetostriction may be generally described as comprising a test specimen suspended from a rigid supporting member and secured to a movable grating of a shutter arrangement formed by a pair of parallel coarse optical gratings, one movable and one fixed, positioned intermediate a light source and a photosensitive device. Expansion or contraction of the test specimen produces a consequent displacement of the movable optical grating relative to the fixed grating, thereby proportionally altering the amount of light reaching the photo-sensitive device through the gratings. The proper magnetic field is achieved by placing a magnetizing coil around the test specimen. Temperature changes accompanying the magnetization of the test specimen may be compensated by a dummy specimen heated to the same degree as the test specimen and arranged to adjust automatically the position of the fixed grating relative to the movable grating.

The possibility of mechanical resonance of the specimen and associated parts inherently minimized by the absence of lever arms and may be further minimized by the use of damping weights carried by the specimen. Since the light received by the primary displacement indicating photosensitive device depends upon the brilliance of the light source as well as the relative grating displacement, a compensating secondary photosensitive device receiving light directly from the light source is preferably connected into the output circuit in order to make the resultant output voltage independent of light-level variations.

The novel features which I believe to be characteristic of my invention are set forth with particularity in the appended claims. My invention itself, however, together with further objects and advantages thereof, may be best understood by reference to the following description taken in connection with the accompanying drawings in which Fig. 1 is a perspective view, partly in section, of the operating parts of one embodiment of my invention as applied to the measurement of magnetostriction, Fig. 2 is a simplified schematic diagram of the measuring device of Fig. 1, and Fig. 3 is an enlarged sectional view of the optical gratings employed in the measuring device illustrated in Fig. 1.

Referring now to Fig. 1, I have shown my invention in one form as including a supporting member 1 which preferably takes the form of a relatively massive bifurcated cantilever supporting beam rigidly secured to a retaining member or wall (not shown). The lower furcation 2 has a cross section which is much smaller than the upper furcation 3 and is separated therefrom by small distance $d$. A small measure of movement of the lower furcation 2 relative to the upper furcation 3 is obtained by a screw 4 threaded from top to bottom through the free end of the upper furcation 3 and pressing against the opposing upper surface of lower furcation 2. Because of the inherent elasticity of furcation 2 and the far greater mass of furcation 3, the rotation of screw 4 causes a vertical motion to be imparted to the lower furcation 2 which may be considered as being relative to the entire supporting member 1. The amount of movement of the opening, $d$, between the free ends of the furcations is indicated by any suitable measuring instrument such as a dial micrometer 5. From this data, the amount of movement of any point along furcation 2, which acts substantially as lever fulcrumed at its point of joinder to furcation 3, can be readily calculated.

Suspended from a lug 6, projecting downward from furcation 2 is a supporting bar 7 to which a specimen 8 of a material which is to be tested is secured by such means as C-clamps 9.

Suspended from the lower end of the test specimen 8 by any suitable means such as C-clamps 10 and supporting bars 11 and 11' is an opaque frame 12 having a window 13 which may be centrally positioned as illustrated. A comparatively coarse optical grating 14 covers the window 13 and is preferably secured to frame 12 so that the grating lines are horizontal.

Means are provided to establish a longitudinal magnetic field creating a measurable degree of magnetic induction in the test specimen 8 which, preferably, takes the form of a coil or solenoid 16 encircling the specimen 8. In order to obtain an accurate relationship between the magnetic induction and the magnetostriction of the specimen, the specimen is preferably clamped so that each end extends somewhat upon supporting bars 7 and 11, thereby leaving only the central portion of the specimen free to impart an overall movement to the entire suspended assembly. Since this central portion of the test specimen is entirely within a corresponding central portion of the solenoid, it is a region of substantially uniform magnetization.

Since the application of alternating current excitation through the solenoid may give rise to undesirable resonant frequencies, I provide a plurality of damping weights 17 composed of a nonmagnetic material which may, in one form as illustrated, comprise a number of brass clamps arranged in parallel fashion on either side of the specimen and individually secured thereto so as not to touch each other at any point. These additional damping weights 17 raise the natural mechanical frequency of the specimen 8 above the test range. If direct current (static) magnetostriction is to be measured, these damping weights 17 may be dispensed with if desired.

A second or "dummy" specimen 18, identical to the test specimen 8, is suspended from the portion of supporting member 1 adjacent the point of joinder of the furcations 2 and 3 in a manner similar to the test specimen 8 by such means as a lug 19, a supporting bar 19' and C-clamps 20. A non-inductively wound coil 21 of the same heat dissipation characteristics as coil 16 is placed around the dummy specimen 18 in order to heat the dummy specimen to the same extent as the test specimen without magnetizing the former.

Suspended from the dummy specimen by C-clamps 22 and a pair of connecting supporting bars 23, 24 is an adjustable drum holder 25 having a large central aperture 26 and carrying a drum 27 which is secured normal to the drum holder 25 around the rim of the aperture 26. The opposite end of drum 27 is secured to a second grating frame 28 located adjacent and in a plane parallel to grating frame 12. Frame 28 has a window 29 aligned to the open end of drum 25 and a notch 30 formed in its upper portion. An adjustable grating holder 31 has a "fixed" grating 32 secured thereto by such means as angle brackets 33 and comprises a flat plate having a window 34 aligned to the grating 32 and a small lug 35 extending within notch 30 formed in the framework 28. The grating holder 31 is secured to the framework 28 by a pivotal connection 36 such as a hinge pin or shouldered rivet. A small measure of horizontal swing about this pivot point 36 is adjustably accomplished by a means of a pair of screws 37 threaded from opposite sides of frame 28 into notch 30 and pressing against the opposite sides of lug 35.

Adjustment of the gratings in a vertical direction is obtained by virtue of a horizontal beam 38 extending parallel to the top of drum holder 25 and secured thereto at one end. An adjustable screw 39 is inserted through a suitable aperture formed in the free end of beam 38 and threaded into the top of the drum holder 25. The supporting rod 24 is fastened by a knee joint 24' to the center of this beam 38 and the entire drum and frame assembly is suspended therefrom. Rotation of screw 39 varies the spacing between the beam 38 and the top of the drum holder 25 thereby imparting a vertical adjustment to the fixed grating 32 which is attached to frame 28.

The optical gratings themselves may, of course, be constructed in many different forms well known to those skilled in the art. I prefer to use a pair of optical gratings 14 and 32 such as are illustrated in enlarged cross section in Fig. 3. A number of parallel grooves 40, forming lines, are etched in the surface of a suitable transparent material, such as optical glass, and filled with an opaque substance. The width of these grooves are exactly equal to the spacing between them with the result that when both gratings are collimately aligned, they may be easily adjusted to obliterate a transverse light beam completely. A small vertical displacement of one of the gratings thereafter causes a relatively large change in the intensity of light transmitted through this shutter arrangement. Although the sensitivity of these gratings is not exceedingly critical, the lines should be close enough to produce the proper magnification, but not so close as to prevent the entire range of magnetostriction movement from falling within the distance between any pair of adjacent lines. Optimum results have been obtained using gratings of approximately 100 lines per inch.

In order to prevent undesirable swaying or lateral vibration of the frameworks holding the gratings, I provide a hinge arrangement comprising four thin sheets 41, 41', 42, 42' of slightly flexible material such as Phosphor bronze secured on one side to the upper and lower end portions of frame 12 and drum holder 25 respectively. The opposite sides of sheets 41, 41' are fastened to an adjustable supporting plate 43 while the opposite sides of sheets 42, 42' are fastened to any suitable stationary supporting member (not shown). Secured to the top and bottom surfaces of these sheets 41 are a pair of rigid plates 44 of slightly smaller length so that they do not entirely cover the sheets 41 but leave a small portion at either end which acts as a flexible diaphragm. These rigid plates 44 function to prevent the bending of the central portion of the thin sheets 41, 41', 42 and 42' while permitting a small measure of vertical motion at either end.

Inserted axially within drum 27 is one end of an illumination directing member 45 which may, in one form as illustrated, be a pipe or cylinder extending rearwardly to supporting plate 43. Longitudinally spaced within the illumination directing member 45 are a compensating secondary photosensitive device 46 such as a conventional photoelectric cell and a source of illumination 47 such as an electric lamp secured within suitable sockets 48 having terminals 49 which preferably are easily accessible externally as illustrated in Fig. 1. The illumination directing member 45 has a collimating lens 50 across its inserted end to produce a beam of parallel rays of light incident upon grating 32.

Means are provided to aim the illumination directing member 45 so that substantially all of the light rays are propagated in a direction normal to the gratings. In one form as illustrated, this adjustment of the direction of the light beam may be accomplished by a plurality of set screws 51 extending through an annular flange 51' which extends from supporting plate 43 and encircles the illumination directing member 45.

In order to align grating 32 in a plane adjacent and parallel to grating 14, I provide a plurality of heavy thumb screws 52 inserted through suitable apertures adjacent the edges of supporting plate 43 and threaded into a suitable rigid supporting member designated by numeral 53. A heavy spring 54 encircles each of these screws intermediate the plate 43 and the supporting member 53 and aids in securely holding the plate 43 in position regardless of the angle to which it is adjusted by the screws 52. Since grating frame 28 is supported by drum 27 which, in turn, is mechanically connected to plate 43 by hinges 41 and 41', adjustment of the position of plate 43 correspondingly varies the position of grating 32 with respect to grating 14.

On the opposite side of the gratings 32 and 14, a second lens 55 and a primary displacement indicating photosensitive device 56 are spaced to intercept consecutively the rays of light transmitted through the gratings 14 and 32. The distance between the lenses 50 and 55 as well as their construction is such that the light beam is focused on this second photosensitive device. Many different arrangements for supporting and adjustably positioning the lens 55 and the primary photosensitive device 56 will obviously occur to those skilled in the art and are omitted from the drawings in order to prevent unnnecessary complication thereof.

Referring now to Fig. 2, I have shown a simplified schematic circuit diagram of my invention. The coils 16 and 21 are connected in series through a selective switch 57 with either an alternating current source 58 or a direct current source 58'. The primary indicating photosensitive device 56 is connected in series with the source of unidirectional voltage such as battery 59, a double-pole, double-throw switch 60 and a load impedance, such as resistor 61. The double-pole, double-throw switch 60 serves to connect a sensitive microammeter 60' into the circuit when thrown to position #1 to permit adjustment of the light level about which variations are to be measured. The secondary compensating photoelectric cell 47 is connected in series with battery 59 and a second current impedance element such as resistor 62 to form a conventional bridge circuit with the primary photoelectric cell circuit. The output voltage is taken across resistors 61, 62 which form adjacent arms of the bridge network. For direct current excitation, this output is preferably amplified by a conventional direct current amplifier designated as block 63, and is measured by a volt meter 63'. For alternating current, this output is also preferably amplified further by a conventional alternating current amplifier, indicated by block 64, before it is applied through coupling condenser 65 and output potentiometer 66 to a volt meter 67. This volt meter 67 is preferably of the type adjusted to read peak alternating voltage rather than the effective value in order to measure peak elongations or contractions of the test sample.

It will be appreciated that because of the extremely small differential variations involved, the entire assembly, with the exception of the test specimens, is preferably constructed from nonmagnetic materials in order to preserve a condition of uniform magnetization of the specimen and to prevent magnetic attraction between the component parts. It will also be appreciated that my invention must be aligned most carefully if accurate and reliable readings are to be obtained. In the alignment procedure, grating 32 is first arranged in a plane adjacent and parallel to grating 14 by adjusting screws 52 inserted through supporting plate 43. Screws 37 are then adjusted until the grating lines are perfectly parallel. The double-pole, double-throw switch 60 is then thrown to position 1 and by reference to the readings of microammeter 60', the screw 39 is turned to adjust the relative vertical displacement of the grating lines in order to produce a proper quiescent light level.

Direct current calibration is accomplished by turning screw 4 in the free end of cantilever supporting beam 1 and plotting the readings of the micrometer 5 against the output readings of the volt meter 63'. The movement of grating 14 caused by movement of the lower furcation 2 at the point of joinder of the supporting lug 6 to furcation 2 accurately represents the movement of the gratings which is subsequently caused by an elongation or contraction of the test specimen suspended therefrom. Therefore, since the ratio between the movement of the free end of furcation 2 and the movement at the point of joinder is easily calculated, the change in the output voltage can be directly related to the change in the dimensions of the specimen.

Thereafter, the micrometer is reset to its zero level and a direct current is applied through coils 16 and 21. The change in output voltage directly indicates the change in the length of the specimen caused thereby. It will be appreciated that if the zero level is set somewhere intermediate the maximum and minimum readings of the output voltmeter, it will be possible to distinguish between positive magnetostriction (elongation) and negative magnetostriction (contraction).

The current which flows through coil 16 around the test specimen 8 also flows through coil 21 encircling the dummy specimen 18. Although coil 21 is non-inductively wound so that no magnetization of the dummy specimen results, both specimens will, nevertheless, be heated to the same degree by the coils. The elongation of both the test specimen and the dummy specimen due to this increase in temperature will be transmitted to both gratings 14 and 32 equally so that no differential due to temperature variations will be present.

The alignment procedure of alternating current excitation is essentially the same as that for direct current excitation. In addition, all alternating current readings may be referred to a standard test specimen thereby permitting a relative calibration to be obtained.

For both alternating current and direct current excitation of the specimen, the relationship between the magnetizing current and the magnetic induction resulting therefrom for any particular specimen can be obtained by conventional methods. Since the magnetizing current and the magnetostriction resulting therefrom may be discovered from my invention, the magnetostriction can be plotted against the magnetic induction of the specimen to provide a curve of great practical utility.

It will be appreciated that although I have shown my invention as applied to the measurement of magnetostriction, it may also be used to measure other small linear displacements of materials caused by various other physical phenomena. It may be used, for example, to measure the expansion of materials due to variations in temperature and thereby to obtain the temperature coefficients of expansion thereof.

It will be understood, therefore, that although I have shown one embodiment of my invention, many modifications may be made, and I, therefore, intend by the appended claims to cover all such modifications as fall within the true spirit and scope of my invention.

What I claim as new and desire to secure by Letters Patent of the United States is:

1. In a magnetostriction measuring device, the combination of a supporting member, means for suspending a pair of specimens of a material to be measured from adjacent points on said supporting member, means to magnetize one of the specimens, means to heat without magnetizing the other of the specimens, a pair of optical gratings arranged respectively to be suspended from the pair of specimens in adjacent parallel planes, means to produce a light beam impinging upon said gratings from a direction normal thereto, said gratings having their grating lines arranged to be horizontally parallel and to control by their relative vertical positions the intensity of said light transmitted therethrough, and means including a photosensitive device to measure the said transmitted light intensity.

2. In a device for measuring the Joule effect of magnetostriction, the combination comprising a horizontally extending bifurcated supporting member having a stationary portion and having its furcations extending from said stationary portion one above the other, its upper furcation being of much greater mass than its lower furcation, means to vary by known increments the distance between the free ends of said furcations, means to suspend a first specimen of a material to be measured from said lower furcation, means to suspend a second specimen having the same temperature coefficient as the first specimen from a stationary portion of said supporting member, a magnetizing solenoid arranged to encircle the first specimen, a heating coil arranged to encircle the second specimen whereby the second specimen is heated to the same temperature as the first specimen, a pair of optical gratings arranged to be suspended from the first and second specimens respectively in adjacent parallel planes, a source of illumination on one side of said gratings, a primary photosensitive device on the opposite side thereof, optical means forming a light beam from said source through said gratings to said primary photosensitive device, said gratings being aligned to control by their relative vertical positions the intensity of said light beam transmitted therethrough, an electrical circuit connected to said primary photosensitive device to produce an output voltage proportional to said transmitted light intensity, and a secondary photosensitive device located to receive light directly from said source of illumination and being connected in said electrical circuit to produce a voltage in opposition to said primary photosensitive device output voltage, thereby to compensate for variations in the intensity of said light source.

3. A device for measuring the magnetostriction of a material when subjected to an alternating magnetic field comprising a supporting member adapted to have a pair of specimens of a material to be measured suspended therefrom, means to produce an alternating magnetic field through one of said specimens including a solenoid encircling said one specimen, means to heat the other specimen to the same temperature as said one specimen including a non-inductively wound coil encircling said other specimen, a pair of optical gratings respectively suspended in adjacent parallel planes from said pair of specimens and moving together therewith, optical means to produce a light beam impinging upon said gratings from a direction normal thereto, said gratings being aligned to vary the level of light intensity transmitted therethrough by their relative vertical position, and means to measure the variations of said level of transmitted light intensity.

WILLIAM D. WILLIAMS.

REFERENCES CITED

The following references are of record in the file of this patent:

UNITED STATES PATENTS

| Number | Name | Date |
| --- | --- | --- |
| 2,122,818 | Lodrach | July 5, 1938 |
| 2,206,853 | Poupitch | July 2, 1940 |
| 2,269,548 | Eldredge | Jan. 13, 1942 |
| 2,293,289 | Gadd | Aug. 18, 1942 |
| 2,301,396 | Graf | Nov. 10, 1942 |
| 2,312,888 | Everest | Mar. 2, 1943 |
| 2,363,964 | Howson et al. | Nov. 28, 1944 |
| 2,397,971 | Martinec | Apr. 9, 1946 |